United States Patent [19]

Röhrle

[11] Patent Number: 5,218,884
[45] Date of Patent: Jun. 15, 1993

[54] TORSION DAMPER, ESPECIALLY FOR MOTOR VEHICLES

[75] Inventor: Dieter Röhrle, Montmorency, France

[73] Assignee: Valeo, Paris Cedex, France

[21] Appl. No.: 886,103

[22] Filed: May 21, 1992

[30] Foreign Application Priority Data

May 23, 1991 [FR] France ................................. 91 06201

[51] Int. Cl.⁵ ............................................. F16F 15/10
[52] U.S. Cl. ......................................... 74/574; 74/572; 464/66; 464/68; 192/106.2
[58] Field of Search ................. 74/572, 573 R, 573 F, 74/574; 464/24, 62, 66, 67, 68; 192/106.1, 106.2

[56] References Cited

U.S. PATENT DOCUMENTS

| | | | |
|---|---|---|---|
| 4,747,801 | 5/1988 | Chasseguet et al. | 464/66 |
| 4,904,225 | 2/1990 | Worner et al. | 74/574 X |
| 5,052,244 | 10/1991 | Kamiya et al. | 74/572 X |
| 5,092,820 | 3/1992 | Naudin et al. | 464/68 |
| 5,095,771 | 3/1992 | Kuhne | 74/572 |
| 5,105,680 | 4/1992 | Naudin | 74/573 F |
| 5,105,681 | 4/1992 | Naudin et al. | 74/574 |
| 5,156,066 | 10/1992 | Janiszewski | 464/66 X |
| 5,168,773 | 12/1992 | Janiszewski | 464/68 X |
| 5,168,775 | 12/1992 | Naudin et al. | 464/67 X |

FOREIGN PATENT DOCUMENTS

| | | | |
|---|---|---|---|
| 0136825 | 4/1985 | European Pat. Off. | 74/574 |
| 8522888 | 11/1985 | Fed. Rep. of Germany | 74/574 |
| 2605370 | 4/1988 | France | 74/574 |
| 2620501 | 3/1989 | France | 74/574 |
| 2620503 | 3/1989 | France | 74/574 |
| 2633686 | 5/1990 | France | 74/574 |
| 2219647 | 12/1989 | United Kingdom | 74/574 |
| 9013755 | 11/1990 | World Int. Prop. O. | 74/574 |
| 9106785 | 5/1992 | World Int. Prop. O. | 74/574 |

Primary Examiner—Vinh T. Luong
Attorney, Agent, or Firm—Longacre & White

[57] ABSTRACT

A torsion damper, for example for a motor vehicle, comprises two coaxial parts which are mounted for rotation with respect to each other against the action of springs. One of these coaxial parts comprises an annular damper plate arranged between two annular radial plates which are secured together through an annular spacing element which surrounds the springs. The damper plate has arms acting on the springs, while the radial plates are fixed in rotation to stop elements. At least one of the circumferential ends of each spring is associated with a resilient element which extends the spring circumferentially, while radial displacement means, carried by either the springs or the spacing element, permit radial displacement of each of these resilient elements.

10 Claims, 5 Drawing Sheets

FIG.1

TORSION DAMPER, ESPECIALLY FOR MOTOR VEHICLES

FIELD OF THE INVENTION

This invention relates to a torsion damper, especially for motor vehicles, comprising two coaxial parts mounted for rotation with respect to each other against the action of circumferentially acting resilient means which are interposed circumferentially between the said coaxial parts, with one of the latter, namely a second coaxial part, comprising an annular damper plate arranged between two annular radial plates of the first coaxial part, the said radial plates being secured together externally by means of an annular spacing element surrounding the said resilient members, wherein the damper plate includes arms projecting radially so as to act on the said resilient members, the said radial plates being coupled to stop elements for rotation with the latter (but, optionally, only after a clearance has been taken up), the said stop elements being part of the said first coaxial part and being arranged to engage the circumferential ends of the resilient members.

BACKGROUND OF THE INVENTION

A torsion damper of the above kind, in the form of a double flywheel, is disclosed in the specifications of U.S. Pat. No. 5,105,681 and French published patent application No. FR 2 660 038A. In the first of those documents, the stop elements are rotatable with the radial plates after a clearance has been taken up, while in the second document, the French published specification, the stop elements are in the form of blocks secured by riveting to the radial plates. In this type of damper, the resilient members, which in practice are of considerable length, may become jammed or rub in contact with the spacing element when the engine is operating at high speeds, and this is detrimental to good vibration damping. It is for this reason that in the document FR 2 660 038A, a second series of springs is provided, with an intermediate, auxiliary damper plate. Although being satisfactory in use, this arrangement does have the disadvantage of being extravagant in space and complicating the construction of the damper plate.

DISCUSSION OF THE INVENTION

An object of the present invention is to overcome this drawback while preserving the advantages of the prior art arrangement.

In accordance with the invention, a torsion damper, especially for motor vehicles, comprising two coaxial parts mounted for rotation with respect to each other against the action of circumferentially acting resilient means which are interposed circumferentially between the said coaxial parts, with one of the latter, namely a second coaxial part, comprising an annular damper plate arranged between two annular radial plates of the first coaxial part, the said radial plates being secured together externally by means of an annular spacing element surrounding the said resilient members, wherein the damper plate includes arms projecting radially so as to act on the said resilient members, the said radial plates being coupled to stop elements for rotation with the latter (but, optionally, only after a clearance has been taken up), the said stop elements being part of the said first coaxial part, and being arranged to engage the circumferential ends of the resilient members, is characterised in that at least one of the circumferential ends of each resilient member is associated with a resilient element which extends the said resilient member circumferentially, and is further characterised in that radial displacement means, carried by one of the elements comprising the resilient members and by the annular spacing element, are provided so as to permit radial displacement of the said resilient element, whereby to reduce friction between the said resilient element and the spacing element.

In a torsion damper according to the invention, even if the resilient members become jammed, vibrations continue to be damped satisfactorily due to the presence of the resilient elements which are provided in accordance with the invention, and which operate without any parasitic frictional effects.

It will be appreciated that this arrangement makes radial interior space available. Thus in the case of the arrangements disclosed in the two prior art documents mentioned above, it is possible to increase the size of the viscous damping means of the double flywheel. It is also possible to make the stop elements movable (within the limits of an angular displacement) with respect to the radial plate as disclosed in U.S. Pat. No. 5,105,681.

All of this enables the angular displacement between the two inertia masses to be increased, while the damper plate is simplified since it no longer has any need to be duplicated as in the arrangement described in the document FR 2 660 038A.

Having regard to the simplification of the damper plate and the increased space made available, the reaction plate of the double flywheel can, in an arrangement according to the invention, be fitted radially inwardly of the resilient members, and close to the damper plate.

In one form of torsion damper in accordance with the present invention, the radial displacement means comprise a plurality of recesses formed locally in the inner periphery of the annular spacing element at the location of the said resilient elements. This arrangement is easy to manufacture having regard to the thickness of the annular spacing element, and enables the resilient members to be placed adjacent to the spacing element.

In another form of torsion damper in accordance with the invention, the said radial displacement means comprise a plurality of pads carried by each said resilient member at its appropriate circumferential end, being adapted to come into contact with the inner periphery of the said spacing element.

In every case the resilient elements that are provided in accordance with the invention are able to be compressed without any risk of jamming or rubbing.

These resilient elements may be an integral part of the associated springs, being defined by circumferential end portions of the springs having a different pitch between adjacent turns from the main part of the spring. This pitch may for example be variable. This arrangement leads to the number of components being minimised. However, in a modification within the scope of the invention, the resilient elements may be separate components from the said resilient members, being coupled with the latter through intermediate pieces.

The description of preferred embodiments of the invention that follows is given by way of example only and with reference to the accompanying drawings.

DESCRIPTION OF PREFERRED EMBODIMENTS OF THE INVENTION

Figure 3:
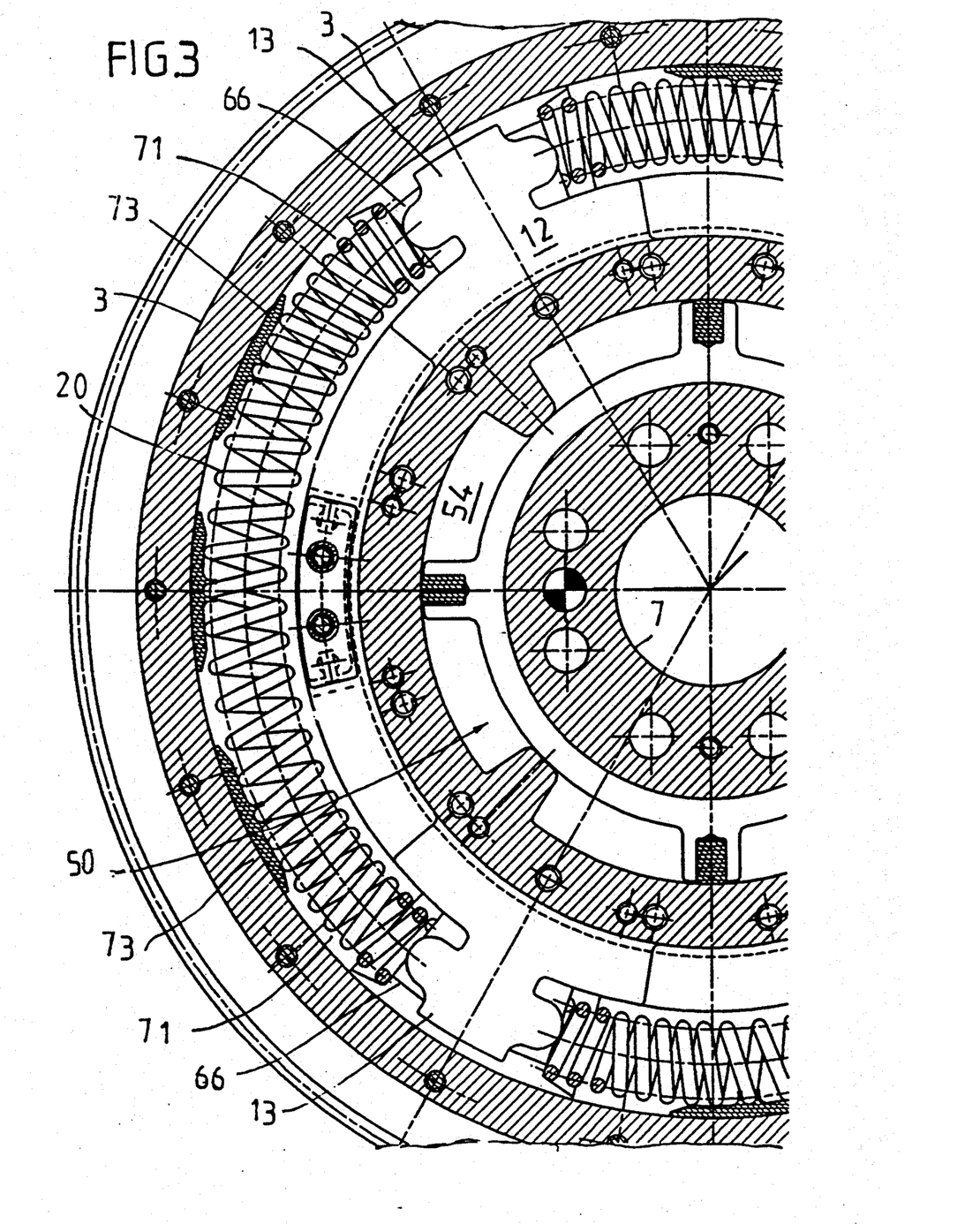
FIGS. 3 to 5 are views similar to FIG. 2, but show, respectively, three further embodiments of the invention.
Figure 4:
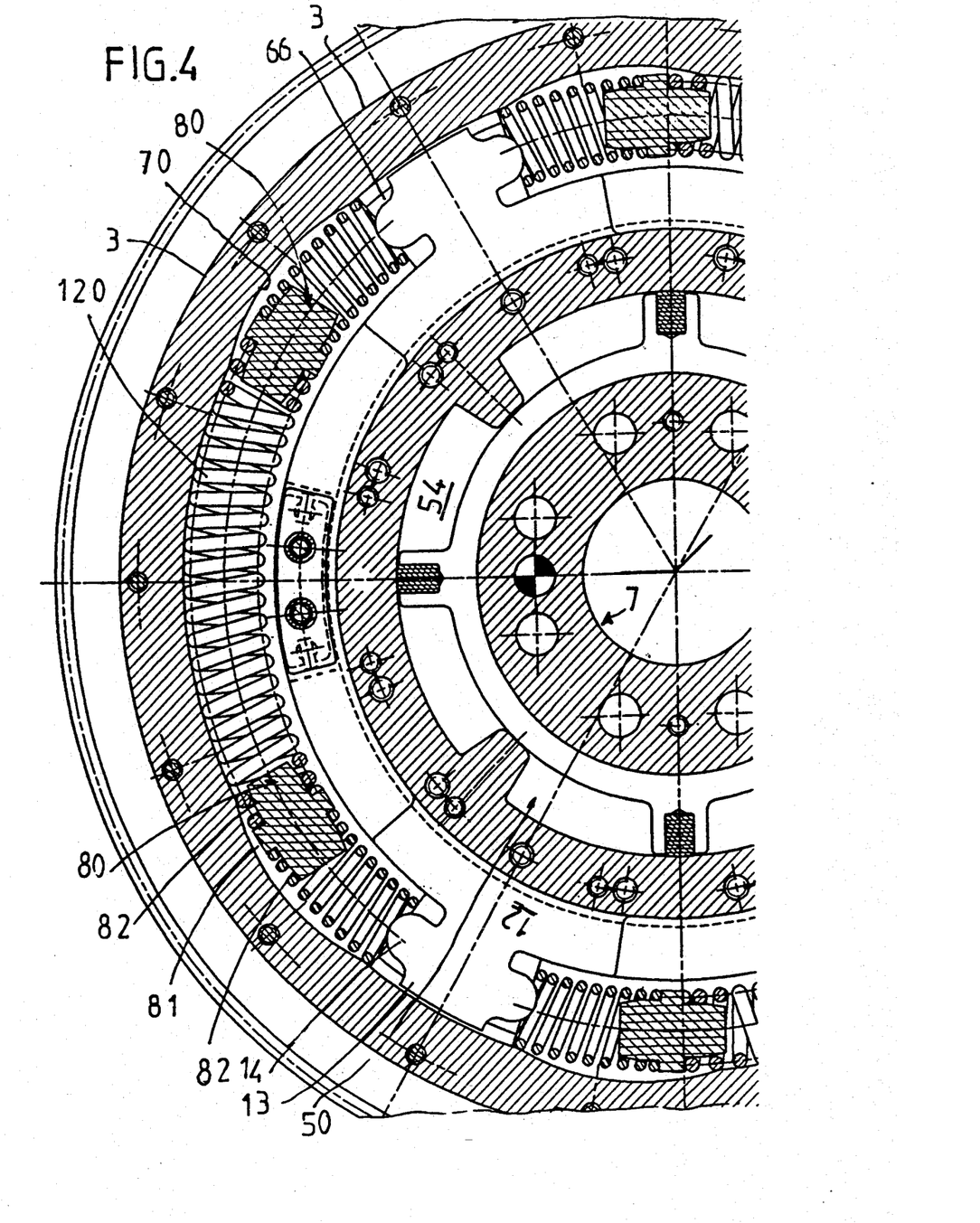
Figure 5:
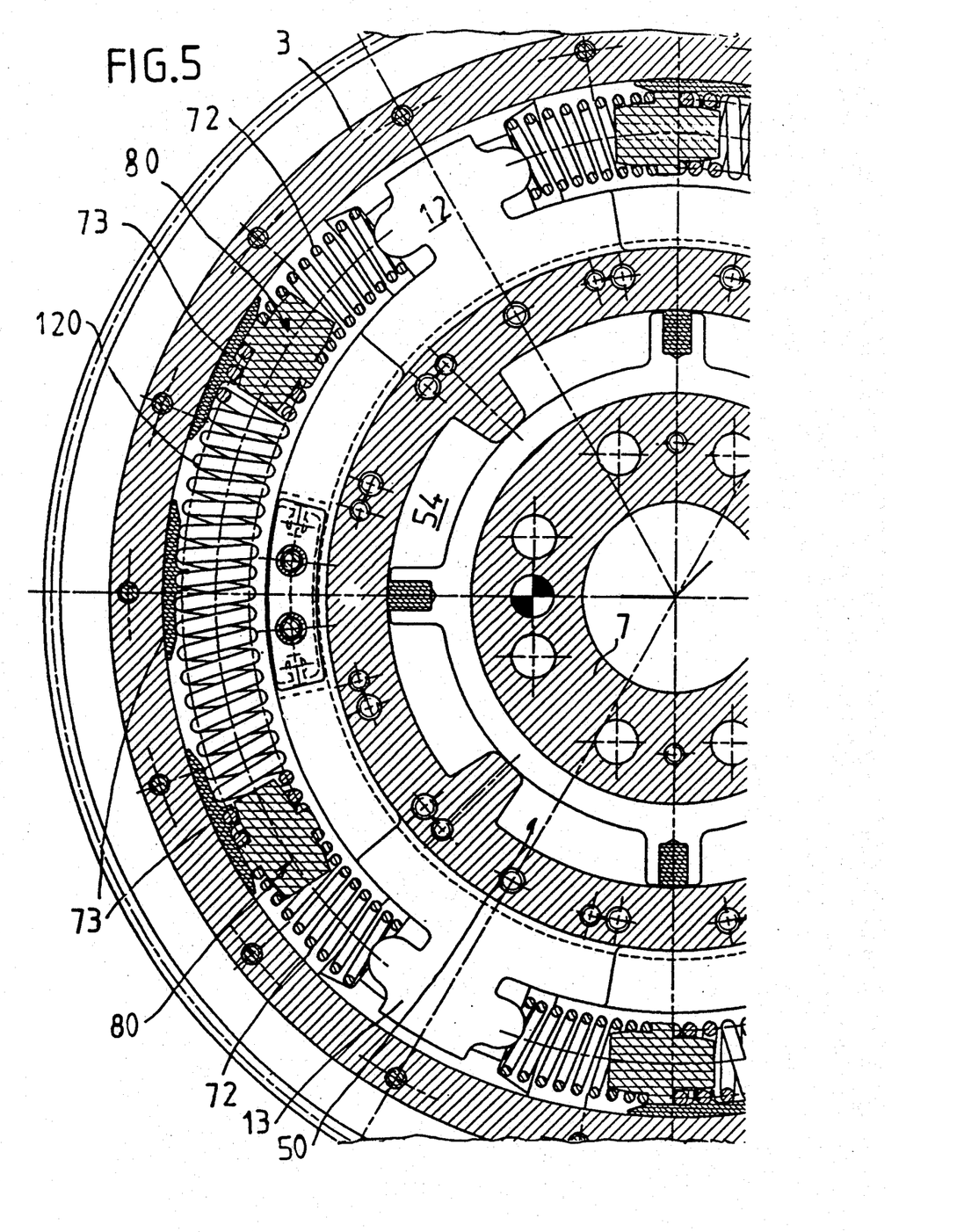

The drawings show a double damped flywheel for a motor vehicle, comprising two coaxial parts 1 and 10 which are mounted for rotation with respect to each other against the action of circumferentially acting resilient members 20 (FIGS. 2 and 3) or 120 (FIGS. 4 and 5). These resilient members are circumferentially interposed between the two coaxial parts 1 and 10. The latter will be referred to, when convenient, as the first coaxial part 1 and the second coaxial part 10.

The second coaxial part 10 comprises an annular damper plate 12 which is arranged between two annular, radial plates 2 and 5 of the first coaxial part 1. The plates 1 and 5 are secured together externally by means of an annular spacing element 3 which surrounds the resilient members 20 or 120. The damper plate 12 includes arms 13 which project radially for action on the resilient members 20 or 120.

The radial plates 2 and 5 are coupled to stop elements 66 for rotation with the latter (but optionally only after a clearance has been taken up). The stop elements 66 are part of the first coaxial part 1, and bear, as can be seen for example in FIG. 2, on the circumferential ends of the coil springs that constitute the resilient members 20 or 120. In this example the two coaxial parts 1 and 10 are in the form of inertia or flywheel masses.

In general terms, at least one of the circumferential ends of each of the resilient members 20 or 120 is associated with a resilient means 71 (FIGS. 2 and 3) or 72 (FIGS. 4 and 5), which extends the resilient member circumferentially. In addition, either each resilient member 20 or 120, or the annular spacing element 3, carries radial displacement means 70 (FIGS. 2 and 4) or 73 (FIGS. 3 and 5). The purpose of these displacement means 70 or 73 is to enable each associated resilient element 71 or 72 to be displaced radially in such a way as to reduce friction between it and the spacing element 3.

The double flywheel as described here is of the general kind described in the specification of U.S. Pat. No. 5,105,681, the disclosure of which is to be regarded as incorporated in the present specification.

More particularly, the first inertia mass 1, which is on the torque input side, comprises a plurality of annular components, namely (apart from the radial plates 2 and 5) a hub 7 and a component 60, 61, 63 which is mounted for free rotation with respect to the hub 7 within the limits of a circumferential clearance. The second inertia mass 10, i.e. in this example the flywheel mass arranged on the torque output side, also comprises an assembly of annular components, namely (apart from the damper plate 12) a reaction plate 11, a further hub 52 and a cover plate 51.

The second inertia mass 10 is mounted for rotation on the first inertia mass 1, by means of a bearing 30 which is interposed radially between the outer periphery of the hub 7 of the first mass 1 and the inner periphery of the hub 52 of the second mass 10.

The second mass 10 is located axially on the first mass 1 by means of this bearing 30. The latter consists, in this example, of a ball bearing having either one or two ball races; in a modification, it may be an anti-friction bearing, for example of the kind having at least one bearing surface of polytetrafluorethylene (or pTFE, for example that known by the Trade Mark TEFLON). For this purpose, the hubs 52 and 7, together with the reaction plate 11, are shouldered, with a supplementary ring 31 being provided so as to locate the inner ring of the bearing 30 axially.

More precisely, the first radial plate 2 is in the form of a hollow plate which carries the annular spacing element 3 integrally at its outer periphery. The starting crown 4 is carried by the spacing element 3. The latter is itself in the form of an annular ring defining an axial flange, at the end of which the second radial plate 5 is tightly secured to it by means of studs 6. The radial plate 5 acts as a counter plate or anvil, and extends towards the axis of the assembly. It will be noted that its radial extent is limited. At its inner periphery, the plate 5 has a short axial flange engaging around the hub 52 of the second coaxial part 10, as can be seen best in FIG. 1.

The radial plates 5 and 2, including the spacing element 3, define a cage 40 containing the coil springs 20 or 120. The cage 40 is partly filled with a suitable lubricating fluid for lubricating the springs 20 or 120, this fluid being typically a suitable grease.

The radial plate 2 is centered at its inner periphery on the hub 7 passages 8', 8 are formed in the hub 7 and radial plate 2, to accommodate centering dowels and securing screws (not shown). Threaded holes 8" (see for example FIG. 2) are also formed axially in the hub 7. The passages 8 are arranged to accommodate screws, the head of each of which bears against the supplementary ring 31 so as to secure the hub 7 and the radial plates 2 and 5 on the crankshaft of the internal combustion engine of the vehicle. The threaded holes 8' accommodate screws (not shown) for securing the radial plate 2 on to the hub 7. The plate 11 of the coaxial mass 10, i.e. the reaction plate of the clutch, is engaged by a friction liner, which may be divided into a number of separate friction pads carried by a friction disc, which is secured to the input shaft of the gearbox for rotation with it.

The reaction plate 11 is formed with an axial flange on which the declutching mechanism of the clutch is fastened. The reaction plate 11 is also secured, by means of threaded fasteners not shown, to the hub 52 of the second coaxial part 10, these fasteners being secured in threaded holes 58 formed in the hub 52. The reaction plate 11 is centered at its inner periphery by means of the hub 52 itself, to which it offers a thrust shoulder.

A viscous damping means 50 is also provided between the primary inertia mass or coaxial part 1 and the secondary coaxial part or inertia mass 10. The viscous damping means 50 lies radially inwardly of the resilient members 20 or 120, and includes a first part 9, 55 which is centered with respect to the first inertia mass 1, together with a second part 51, 52 which is centered with respect to the second inertia mass 10. These two parts 9, 55 and 51, 52 of the viscous damping means together define a closed and sealed cavity 54.

In this example, the first part 9, 55 of the viscous damping means 50 is fixed with respect to the hub 7 of the first inertia mass 1, partly defining the radial inner edge of the cavity 54. The second part 51, 52 of the viscous damping means is fixed with respect to the second inertia mass 10, and is partly defined by the hub 52 of the latter, which (as can clearly be seen in FIG. 2) defines the radially outer boundary of the cavity 54. In the axial direction, the cavity 54 is delimited by the hub 52 and by the cover plate 51, the latter being secured by means of threaded studs 53 secured in the threaded holes 58 in the hub 52.

In this example, the first part of the viscous damping means 50 consists of radial teeth 55 carried by the hub 7 of the first inertia mass 1, together with a radial web 9, thinner than the teeth 55 and projecting radially from the outer periphery of the hub 7, to which it is fixed. The teeth 55 extend radially outwardly and in circumferential alternation with bosses or teeth 57 which are carried by the hub 52. The teeth 57 extend radially towards the axis of the assembly, and project from an outer support portion of the hub 52, which has a hollow, annular shape receiving the teeth 55. Anti-friction pads 56 are interposed between the hub 52 and the teeth 55, so as to center the hub 52 radially with respect to the hub 7.

The alternate teeth 55 and 57 define variable volume chambers between them. A viscous "cassette" is thus defined, with the cavity 54 being filled with a suitable damping fluid such as a silicone based fluid. Seals (two of which are indicated at 41 in FIG. 1) are provided between the two hubs 7 and 52, and also between the radial plate 5 and the hub 52, between the radial plate 5 and the spacing element 3, and between the radial plate 2 and the first hub 7.

The stop elements 66 are part of a component which is mounted for free rotation with respect to the radial plates 2 and 5. This component extends into the cage 40, and comprises a pair of rings 60, each of which is arranged on a respective side of the damper plate 12. Each of the radial arms 13 formed on the outer periphery of the damper plate 12 has lateral fingers 14 which penetrate into the resilient members 20 or 120 in a manner described below. A radial clearance separates the arms 13 from the spacing element 3: this clearance can clearly be seen in FIG. 2.

The stop elements 66 consist of radial arms, formed on the outer periphery of these rings 60 and aligned with the arms 13 of the damper plate. The helical springs constituting the resilient members 20 or 120 are here of substantial length, being separated from each other by the arms 13 and 66.

Figure 1:
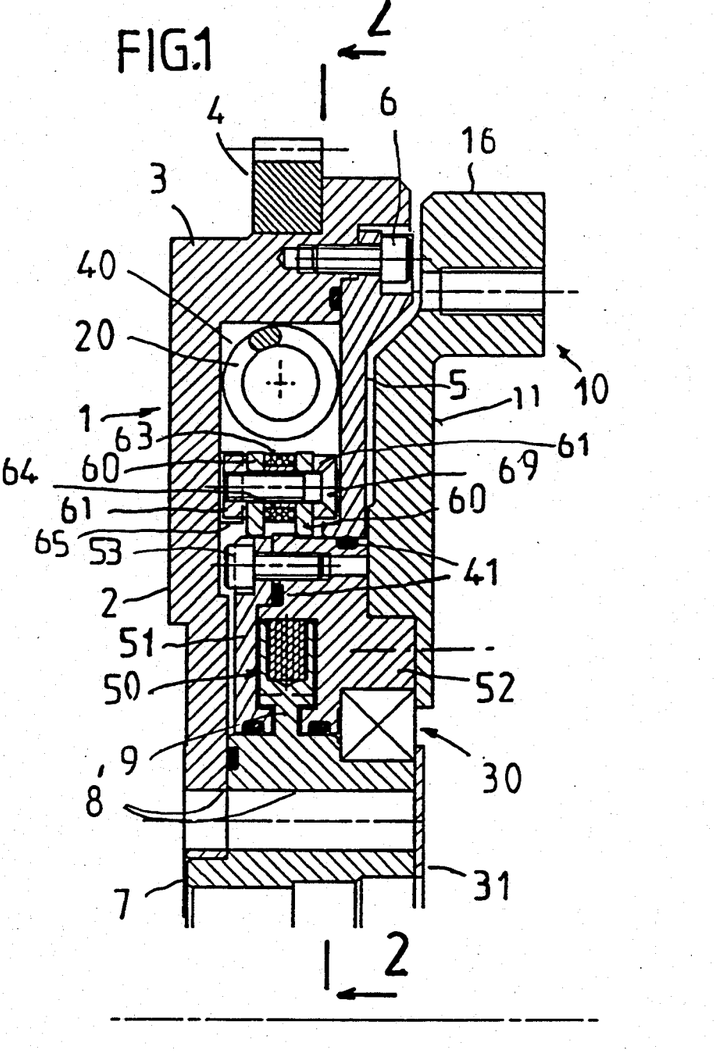
FIG. 1 is a view in cross section, taken on the line 1—1 in FIG. 2, showing part of a double flywheel in accordance the invention.
Figure 2:
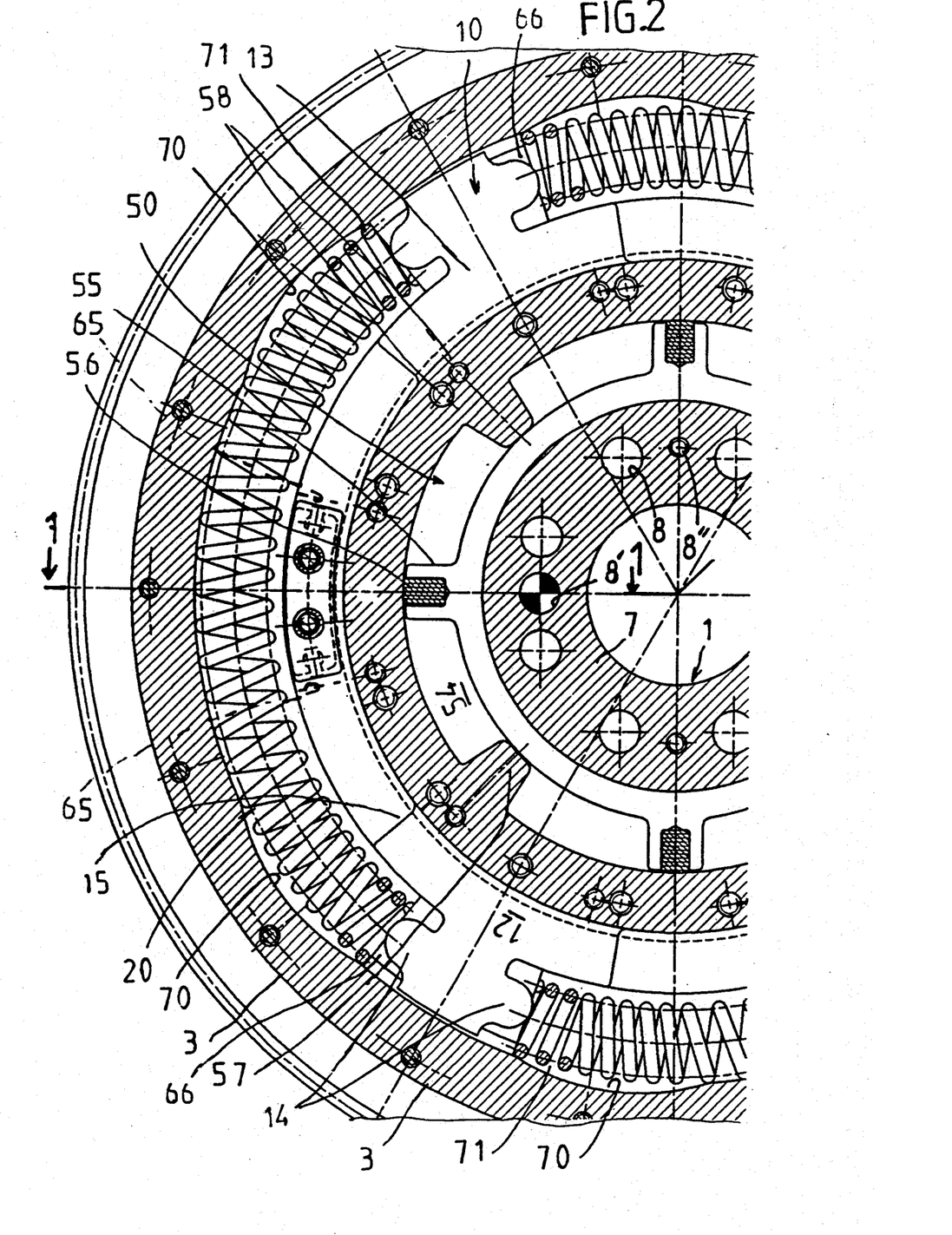
FIG. 2 is a view in axial cross section or the same double flywheel, taken on the line 2—2 in FIG. 1.

In FIGS. 1 and 2, the springs 20 extend circumferentially between the arms 66 with a slight clearance between the circumferential ends of the springs and the arms 13 when the assembly is in its rest condition as shown in FIG. 2. The rings 60 extend radially between the spacing element 3 and the hub 52, while in the axial direction they extend between the two radial plates 2 and 5. The rings 60 are fixed to each other, for rotation together, by means of spacers 64 which extend axially through slots formed between two consecutive arms 13 of the damper plate 12.

For abutting cooperation with the flanks 15 of these slots, each spacer 64 is associated with a resilient pad 63, which, like the spacer 64, is in the form of a circumferentially elongated plate.

The rings 60 move circumferentially within the cage 40, and each ring 60 carries an axially projecting boss 61 (FIG. 1) in the form of a plate, which engages circumferentially with a stop element 65 that is fixed to the corresponding transverse wall of the cage 40 (see FIG. 2). In this example, each boss 61 is carried on the corresponding ring 60 by means of the two spacers 64 that secure the two rings 60 together. Thus each of the rings 60 has three plates 61 projecting from it in various places and corresponding with each other, with each one having generally the same circumferential length as the corresponding resilient pad 33 mounted between the two rings 60. Each spacer 64 comprises a spacing ring interposed between the two rings 60, each of these spacing rings being traversed by a fastening screw 69 which fastens the two plates 61 together. The rings 60 are centered by the hub 52 itself. The stop elements 65 are arranged in pairs on either side of the corresponding bosses 61, and project respectively on either side of the latter, being part of the radial plates 2 and 5 from which they project. In this example, the stop elements 50 are defined by the ends of circumferential ribs formed integrally with the plates 2 and 5. The whole of this sub-assembly extends over a circumferential distance which is smaller than the circumferential length of the springs 20.

With the assembly in its rest position, and in order to define a dead center clearance, the sub-assembly 60, 61, 63, 64 is spaced circumferentially away from one or other of the stop elements 65.

In operation in a "pull off" mode of the assembly, and ignoring any action of the viscous damping means 50, the first inertia mass 1 is initially freely rotatable with respect to the second inertia mass 2. This first phase of operation continues until the rings 60 come into abutment against the corresponding stop element 65 of the radial plates 2 and 5. In a second phase of operation, the clearance between the arms 13 and the ends of the springs 20 is taken up. This is followed by a third phase in which the springs 20 are compressed between the arms 13 and 66, with the fingers 14 penetrating into the interior of the resilient elements 71 so as to support the latter radially and to center them.

The springs 20 can come into contact with the spacing element 3, and may even become jammed in contact with it. So as to preserve the effect of the elasticity of the springs 20, despite this frictional contact with the spacing element 3, in this embodiment the resilient elements 71 consist of circumferential end portions which constitute extensions of the ends of the springs 20, having a different pitch. However, in a modification, this extension portion 71 of each spring may be of variable pitch.

Each end extension portion 71, or resilient element, is integral with the corresponding spring 20 in this example, its pitch (i.e. the pitch between adjacent turns) being smaller than that of the turns of the remainder of the spring 20. The end portion 71 of each spring transmits a smaller torque than the main part of the spring 20. However, it will be understood that the opposite is of course possible, so that the extension portions 71 of a spring 20 transmit a torque which is equal to, or greater than, that transmitted by the remainder of the spring.

Facing each end portion 71, the spacing element 3 is recessed locally in its inner periphery to define an arcuate recess 70. These recesses 70 constitute, in this embodiment, the radial displacement means mentioned earlier. Their purpose is to accommodate a radial displacement of the corresponding end portions 71 of the associated springs. Thus an end portion 71 can be compressed even if the spring 20 is jammed, and provides an effective means of damping out vibrations. The end portion 71 runs no risk of becoming jammed, due to the presence of the recess 70 in the spacing element 3. Thus the end portion 71 is able to deform radially outwardly into the arcuate recess 70. It will be noted that the latter is longer in the circumferential direction than the end portion 71 itself: this avoids any possibility of parasitic frictional effects.

As will be noted from the drawings, the configuration of the slots 70 enables the shape taken up by the corresponding end portion 71 to be matched when the latter is deformed, and this results in a gain in material and minimisation of the mechanical resistance offered by the spacing element 3, this latter being relatively thick in the present example. It will also be noted that the fingers 14 prevent any contact between the end of the end portion 71 and the spacing element 3.

Reference is now made to FIG. 3, in which the radial displacement means (which in the embodiment shown in FIG. 2 consisted of the slots 70) here consist of pads 73 which are carried by each spring 20 itself. These pads 73 are arcuate in shape and are in contact with the inner periphery of the spacing element 3, being fitted around one turn of the corresponding spring 20. In this example, there are three pads 73 associated with each spring 20, two of which are fitted close to the ends of the main or central part of the spring 20, at the level of its junction with the end portion 71 of the spring. Thus, when the end portion 71 is compressed by the arms 13, the latter run no danger of coming into contact with the internal bore of the spacing element 3, due to the radial spacing effect given by the pads 73. The structure of FIG. 3 can of course be reversed, the arcuate pad 73 then being anchored on the spacing element 3 and bearing frictionally against the spring 20.

In the embodiments shown in FIGS. 2 and 3, the supplementary resilient elements (end portions 71) associated with each spring 20 were integral with the springs 20. They may however consist of separate components. This is so in the embodiments shown in FIGS. 4 and 5, in which the springs corresponding to the springs 20 in FIGS. 2 and 3 comprise main springs denoted by the reference numeral 120.

Referring to FIG. 4, each main spring 120 is a coil spring having each to its terminal ends effectively extended circumferentially by means of an additional coil spring 72. The latter is interposed circumferentially between the corresponding stop element 66 and an intermediate piece 80 which is itself interposed circumferentially between the two springs 120 and 72. The fingers 14 are arranged to penetrate into the springs 72 so as to support them radially, while centering and anchoring them.

As with the end portions 71 of the springs 20 in the previous example, the springs 72 transmit a smaller torque than does the associated main spring 120. Again, in a modification the springs 72 may alternatively be arranged to transmit the same torque as the corresponding main spring 120, or even a larger torque.

Each intermediate piece 80 has a central collar portion defining opposed radial shoulders, against which the circumferential ends of the respective springs 120 and 72 abut. Two spigots 82 having tapered ends extend on either side of the collar portion 81 and penetrate into the respective springs 72 and 120 for centering the latter. The intermediate pieces 80 are preferably made of a suitable plastics material.

It will be seen that in FIG. 4, each recess 70 is formed in the spacing element 3 in that part of the latter which overlies the corresponding additional spring 74, and that it extends circumferentially beyond the associated end of the corresponding spring 120. This avoids any risk of the springs 72 becoming jammed. The recess 70 defines a space between the collar portion 81 of the intermediate piece and the spacing element 3.

Referring now to FIG. 5, this shows, for an assembly having the separate additional springs 72, a similar modification from the arrangement shown in FIG. 4 to that by which the arrangement shown in FIG. 3 differed from FIG. 2. In FIG. 5, the intermediate piece 80 lies radially within the corresponding pad 73 that is arranged at the circumferential end of the associated main spring 120. It will be noted that the pads 73 are chamfered so as to prevent any interference with the spring 72 at the end of the latter.

As will be understood from the foregoing description and from the drawings, the springs 20 or 120 are long in the circumferential direction, with three of these springs being provided and being arranged on a pitch circle of large diameter, close to the spacing element 3. However, it will be understood that there may only be two of these springs. It will also be noted that the circumferential length of each recess 70, where provided, depends on the applications to which the assembly is to be put, and in particular on the clearance in the vicinity of the contact surfaces.

The arrangement exemplified by the embodiments shown in the drawings makes internal space available which enables the size of the viscous damping means to be increased. This latter may only have four teeth 55, 57. It will be recalled that the viscous damping means is adapted to have effect by transfer of fluid between the chambers 54, in particular on starting and stopping of the vehicle, during passage through the resonant frequency below the slow running mode of the engine.

The present invention is of course not limited to the embodiments described above and shown in the drawings. In particular, the stop elements 66 may be replaced by blocks which are riveted on to the radial plates 2 and 5 as disclosed in the specification of published French patent specification No. FR 2 660 038A. Alternatively, they may be replaced by pressed elements, the sub-assembly 60, 61, 63, 64 being omitted. The use of grease may also be omitted.

The spacing element 3 may be secured to the radial plates 2 and 5 by riveting for example. Similarly, the viscous damping means itself may be omitted, and the resilient elements exemplified above by the end portions 71 or additional springs 72 may be associated with only one of the circumferential ends of the springs 20 or 120, instead of both ends.

Again, as described in the specification of U.S. Pat. No. 5,105,681, inserts may be provided between the arms 66 (or blocks if these are provided instead) and the resilient means 71 or 72, with the arms 13 of the damper plate being slotted for cooperation with these inserts, or else having fingers cooperating with the slotted inserts.

In all cases, the fingers or blocks are arranged so as to prevent any contact of the resilient means (e.g. 71 or 72), possibly in the form of a hollow block of a resilient material, with the spacing element 3, the inserts being arranged to pivot preferably without entering into contact with the spacing element.

One of the radial plates 2 or 5 may be made with a small radial dimension, in particular when the resilient members such as the springs 20 or 120 are located outside the reaction plate 11. Such radial plate may then have a half shell shape following the shape of the springs 20.

Finally, in the embodiment shown in FIG. 2, the end portions 71 of a spring 20 may be arranged with the same pitch as the main part of the spring.

What is claimed is:

1. A torsion damper comprising: a first part; a second part; means mounting the two said parts coaxially with each other for relative rotation of one with respect to the other: and a plurality of circumferentially acting resilient members defining circumferential ends thereof and interposed circumferentially between the two said coaxial parts, the said first coaxial part comprising two annular, radial plates together with an annular spacing element spacing the said radial plates apart and surrounding the said resilient members, and means including the said spacing element fastening the two radial plates together, the said second coaxial part including an annular damper plate disposed between the two said radial plates, with the damper plate having radially projecting arms for engaging on the said resilient members so as to act thereon, the first coaxial part further defining a plurality of stop elements engaging the circumferential ends of the said resilient members, and means coupling the said radial plates to the stop elements for rotation with the latter, wherein the torsion damper further comprises a resilient element circumferentially extending at least one end of each said resilient member, together with means carried by one of the elements selected from the said resilient members and the annular spacing element and defining radial displacement means associated with each said resilient element for permitting radial displacement of the latter, whereby to reduce friction between the resilient element and the spacing element.

2. A torsion damper according to claim 1, wherein each said resilient element is so dimensioned as to transmit a torque smaller than that transmitted by the unextended portion of the associated resilient member.

3. A torsion damper according to claim 1, wherein each said resilient element is so dimensioned as to transmit a torque at least equal to that transmitted by the unextended portion of the associated resilient member.

4. A torsion damper according to claim 1, wherein the annular spacing element has an inner periphery defining a plurality of recesses, constituting the said radial displacement means and formed locally in its inner periphery so as to overlie a respective one of the said resilient elements.

5. A torsion damper according to claim 1, wherein the annular spacing element has an inner periphery, the said radial displacement means comprising a plurality of pads carried by the said resilient members at their circumferential ends for engagement with the inner periphery of the said spacing element.

6. A torsion damper according to claim 1, wherein the said resilient members comprise coil springs, each said resilient element comprising a circumferential extension of the corresponding spring itself, in the form of turns of that spring having a pitch different from the pitch of the turns in the remainder of the spring.

7. A torsion damper according to claim 1, wherein the said resilient members comprise main coil springs, wherein the said resilient elements comprise additional coil springs.

8. A torsion damper according to claim 7, further comprising an intermediate piece interposed circumferentially between each said main spring and the each associated additional spring, the latter being interposed between the associated intermediate piece and the said stop element.

9. A torsion damper according to claim 8, wherein each said intermediate piece comprises a central collar portion defining opposed abutment surfaces for respective engagement with the circumferential ends of the associated main spring and additional spring, and two spigots extending one on each side of the said collar portion, each spigot having a tapered end penetrating into the associated spring for centering the latter.

10. A torsion damper according to claim 1, further including a finger carried by each said arm of the damper plate for centering the associated said resilient element.

* * * * *